(12) United States Patent
Ratchev et al.

(10) Patent No.: US 7,935,171 B2
(45) Date of Patent: May 3, 2011

(54) PRODUCTION OF METALLIC NICKEL WITH LOW IRON CONTENT

(75) Inventors: Ivan Ratchev, Jesmond (AU); Houyuan Liu, Henderson, NV (US); Alexey Duarte, Bogota (CO); Harald Theowald Muller, Eleebana (AU)

(73) Assignee: BHP Billiton SSM Development Pty Ltd. (AU)

( * ) Notice: Subject to any disclaimer, the term of this patent is extended or adjusted under 35 U.S.C. 154(b) by 0 days.

(21) Appl. No.: 12/438,418

(22) PCT Filed: Aug. 22, 2007

(86) PCT No.: PCT/AU2007/001194
§ 371 (c)(1),
(2), (4) Date: Jan. 6, 2010

(87) PCT Pub. No.: WO2008/022381
PCT Pub. Date: Feb. 28, 2008

(65) Prior Publication Data
US 2010/0154593 A1    Jun. 24, 2010

(30) Foreign Application Priority Data
Aug. 23, 2006    (AU) .................................. 2006904585

(51) Int. Cl.
*C22B 3/42*     (2006.01)
*C22B 23/00*    (2006.01)

(52) U.S. Cl. ................. 75/416; 75/629; 75/739; 75/743; 205/589; 205/594

(58) Field of Classification Search .................... 75/743, 75/739, 416, 629; 205/589, 594
See application file for complete search history.

(56) References Cited

U.S. PATENT DOCUMENTS

| 5,571,308 A | 11/1996 | Duyvesteyn et al. |
| 6,261,527 B1 | 7/2001 | Arroyo et al. |
| 7,585,350 B2 * | 9/2009 | Duarte et al. ................... 75/430 |
| 2001/0001650 A1 | 5/2001 | Duyvesteyn et al. |
| 2002/0041840 A1 | 4/2002 | Arroyo et al. |
| 2006/0263282 A1 | 11/2006 | Francis et al. |

FOREIGN PATENT DOCUMENTS

| WO | WO 2002/008477 | 1/2002 |
| WO | WO 2006/029443 | 3/2006 |
| WO | WO 2006/053376 | 5/2006 |
| WO | WO 2006/069416 | 7/2006 |
| WO | WO 2006/089358 | 8/2006 |

* cited by examiner

*Primary Examiner* — George Wyszomierski
*Assistant Examiner* — Tima M McGuthry-Banks
(74) *Attorney, Agent, or Firm* — Brinks Hofer Gilson & Lione; G. Peter Nichols

(57) ABSTRACT

A process for producing a metallic nickel product with a low iron content, that includes: (i) providing an acidic product liquor; (ii) subjecting the acidic product liquor to an ion exchange process to absorb the nickel and part of the iron; (iii) eluting the nickel and iron to produce an eluate containing the nickel and iron. (iv) neutralising the eluate to leave an iron depleted eluate; (v) neutralising the iron depleted eluate to cause precipitation of nickel hydroxide containing low iron; (vi) calcining the nickel hydroxide to convert it to nickel oxide; (vii) subjecting the nickel oxide to direct smelting in the presence of a reductant to produce a molten nickel phase; and (viii) refining the molten nickel phase by oxidation to produce a metallic nickel product with low iron content.

19 Claims, 1 Drawing Sheet

PRODUCTION OF METALLIC NICKEL WITH LOW IRON CONTENT

This application claims priority to PCT Application Serial No. PCT/AU2007/001194 filed Aug. 22, 2007 published in English on Feb. 28, 2008 as PCT WO 2008/022381 and also to Australian Application No. 2006/904585 filed Aug. 23, 2006, the entire contents of each are incorporated herein by reference.

FIELD OF THE INVENTION

In general, the present invention relates to a new method for producing metallic nickel with low iron content from an acidic nickel containing liquor produced by leaching nickel ores or concentrates. The method is particularly suited to nickel containing acidic product liquor derived from nickel containing ore bodies or concentrates by a process such as: pressure acid leaching, atmospheric acid leaching and/or heap leaching of a laterite ore; or oxidative leaching or bioleaching of nickel sulfide ores or concentrates; followed by ion exchange to recover nickel. Treatment of the nickel containing ion exchange eluate to remove iron is followed by precipitation of the nickel as nickel hydroxide, which is then calcined, smelted and refined to produce a novel metallic nickel product with a low iron content.

BACKGROUND OF THE INVENTION

Laterite nickel and cobalt ore deposits, or nickeliferous oxide ore deposits, generally contain oxidic type ores, limonites, and silicate type ores, saprolites, as two layers in the same deposits, separated by a transition zone. The limonitic zone includes goethite (FeOOH) and is relatively low in magnesium and nickel content. The saprolite zone includes various magnesium silicates and contains relatively higher magnesium and nickel. To minimise the equipment size for processing either the saprolites or the limonites by commercial processes, high grade limonite and saprolite are preferred. This leads to the lower grade ores and transition ores in some deposits being rejected as waste.

The high nickel and cobalt content limonite is normally commercially treated hydrometallurgicaly by a high pressure acid leach process, or by a combination of pyrometallurgical and hydrometallurgical processes, such as the Caron reduction roast-ammonium carbonate leach process.

The higher nickel content saprolites tend to be treated by a pyrometallurgical process involving roasting and electrical smelting techniques to produce ferronickel, containing generally greater than fifty percent iron together with a reject slag phase. Lower iron content metallic nickel cannot be produced by this method due to the difficulties associated with the movement of the majority of the iron into the slag, and the additional nickel losses with the increased slag quantities.

The ferronickel process is a highly energy intensive process as the ratio of total ore to nickel is typically forty to one, and most of the power is expended in melting slag. It requires a high grade saprolite source to make it economic. The power requirements and high iron to nickel ore ratio for the lower nickel content limonite, saprolite, and limonite/saprolite blends in the transition zone make this processing route too expensive for these ore types.

Accordingly, in the ferronickel process, considerable nickel ore resources, including some high grade nickel ore, are rejected to waste because of their relatively lower grade or unsuitable Si/Mg/Fe ratio for slag-making. The ferronickel process, ie RKEF process (Rotary Kiln and Electric Furnace) also has the disadvantage that the financial value of any cobalt in the ore, which reports to the ferronickel, is not realised. Moreover, the high content of iron in ferronickel restricts its end use to stainless steel production only.

The above processes generally require "whole ore" processing as there is no effective method to beneficiate the ore. This has the disadvantage that the mineralogical fractions of the ore which may contain lower metal values effectively dilute the total treated ore quality and increase recovery costs.

It would be desirable to provide a simpler, less energy intensive, and lower capital investment process to produce metallic nickel with low iron content (as herein defined), which overcomes or at least alleviates one or more of the difficulties associated with the prior art.

It would also be desirable to provide a process for producing low iron content nickel using a wide range of nickel containing ores, particularly laterite ores which are considered unexploitable by conventional processes. It would further be desirable to provide a process for producing nickel having a sufficient purity for general sale to the nickel market.

Nickel hydroxide intermediate with low or no iron content is produced as an intermediate nickel compound commercially in the Cawse Plant in Australia. In the Cawse process, lateritic nickel ore is subjected to a high pressure sulfuric acid leach to extract the nickel and cobalt, along with other impurities. Waste ore and some impurities are separated from the leachate after multi-stage neutralisation and solid/liquid separation, and a mixed nickel cobalt hydroxide is precipitated by further neutralisation with magnesium oxide.

Nickel hydroxide intermediate production by a similar process is also described in the prior art. For example, it may be produced as an intermediate from the leachate from high or atmospheric pressure acid laterite leaching or a combination of both, heap leaching of laterite or nickel sulfide ores or concentrates, or high pressure or atmospheric pressure leaching of sulfide ores or concentrates. The literature also teaches that nickel hydroxide may be produced from acidic nickel sulfate solutions produced as eluates, strip solutions, or raffinates from solvent extraction or ion exchange treatment of the prior mentioned process leachates or leach slurries.

International application PCT/AU2005/001360 in the name of BHP Billiton SSM Technology Pty Ltd discloses a process for the production of ferronickel or nickel matte by combined hydrometallurgical and pyrometallurgical processes. In the process disclosed in this specification, the nickel and iron are selectively absorbed on to a resin in an ion exchange process and thus separated from other impurities, eluted from the resin with sulfuric acid and the eluate is neutralised to precipitate a mixed nickel iron hydroxide product. The mixed nickel iron hydroxide product is then reduced directly to produce a ferronickel or nickel matte product.

In a further development of this process International Application PCT/AU2006/000225 in the name of BHP Billiton SSM Technology Pty Ltd discloses a process for the production of a high quality ferronickel product by a method which involves pelletisation of a mixed nickel iron hydroxide product, calcination to produce pellets of nickel iron oxide, and reduction of the oxide to ferronickel. Given the relatively high iron content in the calcined pellets of nickel iron oxide, the pellets are sufficiently reactive to be reduced by reaction with a gaseous reductant.

An improvement to the above processes would be to produce metallic nickel with low iron content directly from a nickel intermediate, thereby providing a higher purity nickel product.

The above discussion of documents, articles and the like is included in the specification solely for the purpose of providing a context for the present invention. It is not suggested or represented that any or all of these matters formed part of the prior art base or were common general knowledge in the field relevant to the present invention before the priority date.

SUMMARY OF THE INVENTION

According to the present invention, there is provided a process for producing a metallic nickel product with a low iron content, including the steps of:
(i) providing an acidic product liquor containing at least nickel and iron;
(ii) subjecting said acidic product liquor to an ion exchange process wherein an ion exchange resin selectively absorbs said nickel and part of the iron from said product liquor;
(iii) eluting the nickel and iron from said resin with an acidic solution to produce an eluate containing said nickel and iron;
(iv) neutralising said eluate to a pH value in the range from 2.5 to 3.5 to cause precipitation of a substantial amount of said iron, leaving an iron depleted eluate;
(v) neutralising the iron depleted eluate to a pH value in the range from 7 to 8 to cause precipitation of nickel hydroxide containing a low iron content;
(vi) calcining said nickel hydroxide to convert it to nickel oxide;
(vii) subjecting said nickel oxide to direct smelting in the presence of a reductant to produce a molten nickel phase; and;
(viii) refining said molten nickel phase by oxidation to produce a metallic nickel product with low iron content.

Typically, "low iron" means up to 1% iron and includes a zero iron content.

Accordingly, there is provided a process for producing low iron content nickel from an acidic nickel containing liquor. Typically, the liquor is produced by leaching nickel ores or concentrates. The process is particularly suited to nickel containing acidic product liquor derived from nickel containing ore bodies or concentrates by a process such as high or enhanced pressure acid leaching, atmospheric acid leaching, atmospheric acid agitation leaching or heap leaching of a laterite ore or by oxidative leaching or bio-leaching of nickel sulfide ores or by any combination of the above. After separation of the acidic nickel containing leach liquor from the ore residue, and removal of any copper therefrom, the liquor is treated by ion exchange (IX) for the separation of nickel and iron from other impurities. Treatment of the nickel containing ion exchange eluate to remove iron is followed by precipitation of the nickel as nickel hydroxide, which is then calcined, smelted and refined to produce a novel metallic nickel product containing low iron.

The process is applicable to processing a wide range of nickel containing ores and is particularly applicable to processing laterite ores which are considered unexploitable with conventional processes. In one embodiment, the invention is applicable to a process where the laterite ore is subjected to a heap leach followed by an ion exchange process, where the nickel is firstly leached with sulfuric acid and then recovered as a product liquor solution containing nickel, cobalt and iron. In a preferred form of the invention, the low iron containing metallic nickel product is produced from a low iron nickel hydroxide product recovered from the eluate of an ion exchange process.

In general, the process forms part of an overall process for the recovery of nickel from a laterite ore. In a preferred embodiment the metallic nickel product is produced from a nickel hydroxide intermediate produced by the following general process. A pregnant leachate solution is produced by a heap leach process, preferably a counter current heap leach process of a laterite nickel containing ore using sulfuric acid. The pregnant leachate containing at least nickel, cobalt and iron will then be treated by an ion exchange (IX) process, where any copper in the leachate is preferentially extracted. The copper free pregnant leachate is then treated by a second IX process, where the nickel and part of the iron and cobalt are extracted onto the resin, with most of the iron and cobalt remaining in the raffinate. The nickel and iron are then eluted from the resin with an acid, and the eluate neutralised to pH 2.5 to 3.5 to precipitate most of the iron from solution as goethite or iron hydroxide. The eluate is then further neutralised to a pH from 7 to 8 with a neutralising agent such as magnesium oxide, soda ash or caustic soda to precipitate the nickel hydroxide.

Any copper that may be present in the product liquor should be removed for recovery prior to the nickel/iron ion exchange process as some resins have a higher affinity to copper than nickel and iron. The copper is readily removed from the product liquor by one of ion exchange, solvent extraction or other known techniques. Preferably, however, any copper present in the product liquor is removed by an additional ion exchange process wherein an ion exchange resin selectively absorbs copper from the product liquor prior to step (i) of the inventive process. The copper values may then be recovered by conventional processes.

Typically the ion exchange resin used in step (ii) of the inventive process is one conventionally used in ion exchange processes. Preferably, where the product liquor is derived from leaching a laterite ore, the resin has a bis-picolylamine functional group, such as that sold under the trade name DOWEX™ M4195 resin. Such resins are able to separate nickel and a part of the iron and cobalt, from other impurities which are typically present in product liquors derived from leaching lateritic ores. The nickel and part of the iron and cobalt are separated from other impurities in the ion exchange process of step (ii). The nickel and part of the iron and cobalt will be loaded on to the resin, while most of the iron and cobalt remains in the raffinate. The cobalt may be subsequently recovered from the raffinate by conventional techniques such as solvent extraction, ion exchange, or precipitation as a sulfide, carbonate or hydroxide.

In step (iii) of the inventive process, the nickel and iron are eluted from the resin with an acidic solution. Preferably the acidic solution is sulfuric acid.

The neutralisation of the free acid in the nickel and iron loaded eluate is carried out in two stages: iron precipitation in step (iv) and nickel precipitation in step (v).

Limestone may be used as the neutralising agent in the first neutralisation step (step (iv) of the inventive process) to increase the pH to around 2.5 to 3.5, precipitating gypsum as the neutralisation product together with goethite, or iron hydroxides which can be readily filtered out. Other suitable neutralising agents such as magnesium carbonate, magnesium oxide, soda ash or caustic soda may also be used depending on the economics. While iron starts to precipitate out of solution at around pH of 1.5, a higher pH in the range of 2.5 to 3.5 is required to remove substantially all of the iron from solution. By controlling the amount of neutralising agent added, and therefore the pH of solution, the amount of iron in the final metallic nickel product can be controlled to a desired value.

The precipitation of a substantial amount of iron from the eluate in the first neutralisation step leaves an iron depleted eluate which is then subjected to a second neutralisation step.

Magnesium oxide and/or soda ash and/or caustic soda can then be used to further neutralise the eluate in the nickel precipitation stage (step (v) of the inventive process), preferably to a pH of greater than 7.5 to precipitate almost all the nickel as a nickel hydroxide product. The nickel hydroxide contains low or no iron, preferably no more than 0.5% iron.

The nickel hydroxide product recovered from the ion exchange eluate is suitable for processing to the nickel in accordance with the process of the invention. The nickel hydroxide product would generally be in the form of a wet cake. Preferably, the nickel hydroxide product is dried at a temperature of about 100° C.-120° C.

In step (vi) of the process, the nickel hydroxide is calcined to convert it to nickel oxide. Preferably, calcination takes place at temperatures of about 800° C.-1300° C. under oxidising conditions to convert the nickel hydroxide to nickel oxide substantially free of sulfur. More preferably, the calcination temperature is in the range of 1050 to 1300° C. Where nickel was eluted using sulfuric acid in step (iii), calcination will typically remove any remaining sulfur by oxidation to sulfur dioxide or sulfur trioxide.

Generally, the calcination step will occur in a kiln, travelling grate, shaft furnace, multi-hearth furnace or any other suitable reactor for calcining such products. The oxidising conditions are provided by the addition of air or other oxidising gases within the reactor or through the solid bed.

In step (vii), the nickel oxide is subjected to direct smelting reduction in the presence of a reductant, most preferably carbon, to produce a molten nickel metal phase. Most preferably a suitable slag is also present. In a preferred embodiment, the calcined, de-sulfurised nickel oxide is direct smelted with carbon in the presence of a synthetic slag at around 1540° C. A suitable slag may be $CaO-Al_2O_3$-based, although a wide variety of slags may be used. Where the nickel hydroxide is likely to contain appreciable MgO, an important requirement in this case is that the mass of the slag and its solubility of magnesium oxide are high enough to accommodate the gangue in the calcined nickel oxide.

In step (viii), the molten nickel phase is refined to remove any residual carbon by oxidation. This may be carried out by oxygen injection or other conventional methods.

The metallic nickel product with low iron content, which is produced by the invention, although not as pure as London Metal Exchange Nickel requirements, is suitable for direct addition to a stainless steel melt. The product is of sufficient purity as the majority of the impurities have been removed following selective nickel/iron ion exchange processing and the product contains low levels of sulfur after calcining. Preferably, the nickel product will have a magnesium content of below 0.5% after the refining step, a sulfur content of below 0.1% and a carbon content between 0.01% to 0.05%.

The nickel produced from the process is suitable for addition to stainless steel furnaces or may be used for other applications

DETAILED DESCRIPTION OF DRAWING

Figure 1:
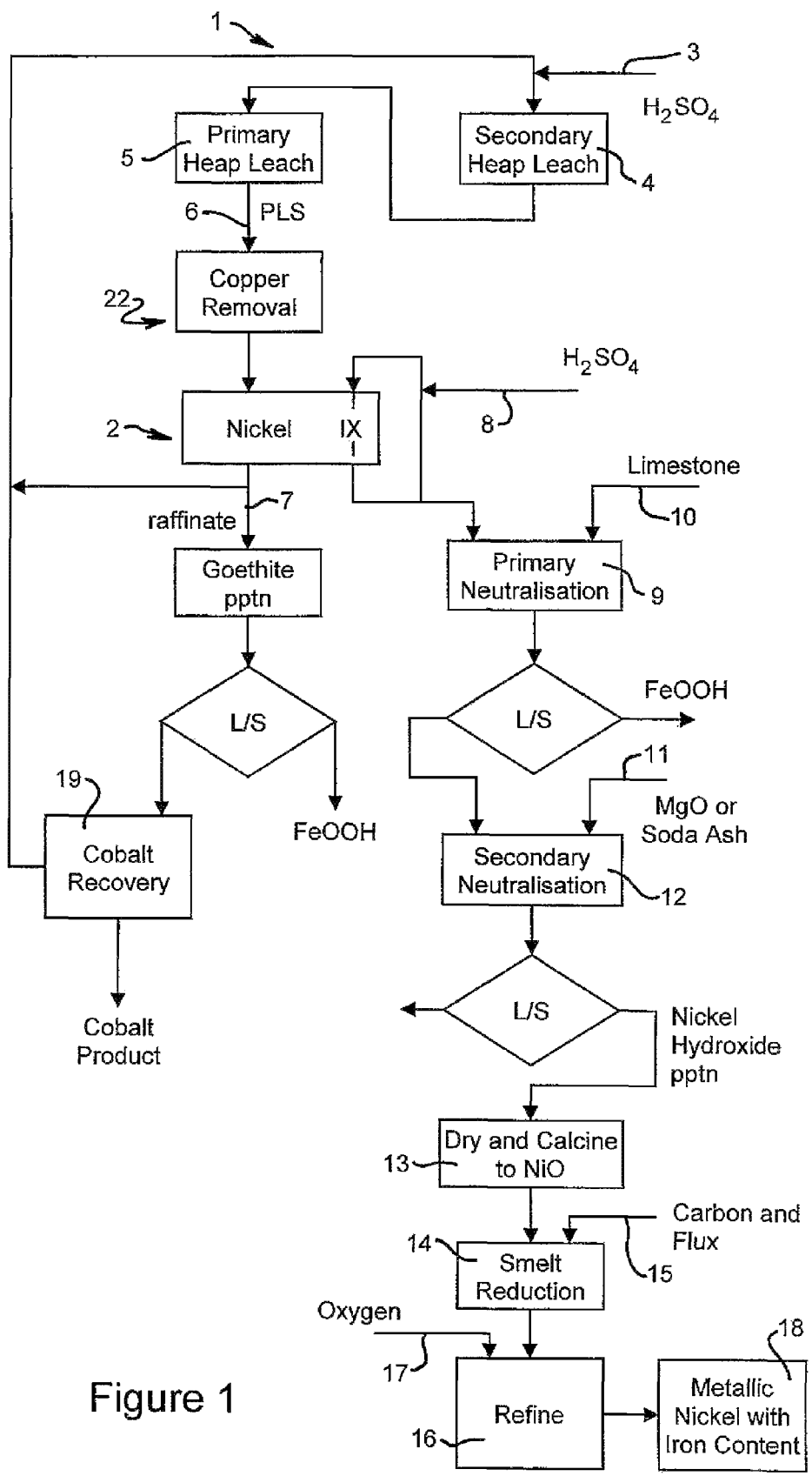
FIG. 1 illustrates a preferred flowsheet in accordance with the process of the invention.

In a preferred embodiment, where the product liquor solution results from an acid heap leach process, laterite ore is crushed to a size, preferably less than 25 mm size and agglomerated using water, sulfuric acid, or other binding materials, to improve heap permeability.

The agglomerated ore may be arranged into at least one heap but preferably at least two heaps, a primary and a secondary heap, to be operated as a counter current heap leach system. The counter current heap leach process has the advantage of lower acid consumption, and a lower iron containing product solution than the single heap system.

In a preferred method, which is illustrated in FIG. 1, the leach solution is sourced from the nickel depleted recycled raffinate (1) from the nickel ion exchange step (2), supplemented with sulfuric acid (3), and added to the secondary heap (4) producing an intermediate product liquor solution, which is then added to the primary heap leach (5) in a counter current process. This produces a nickel and cobalt rich product liquor solution (PLS) (6) with low acidity, which also contains iron and a number of other impurities. When the secondary heap is depleted of nickel, it is discarded, the primary heap becomes the secondary heap, and a new ore heap becomes the primary heap.

The PLS is optionally treated in step 22 to remove any copper present in solution. It is then treated by an ion exchange (IX) process (2), where the majority of the nickel and some of the iron and cobalt is loaded on the resin bed, and the major portion of the iron, cobalt and almost all other impurities, remain in the raffinate solution and pass through. The resin for example, is DOWEX™ M4195 with a functional group of bis-picolylamine. At a pH value of 2 the absorption constants indicating selectivity of the resin are in the order: $Ni^{+2}>Fe^{+3}>Co^{+2}>Fe^{+2}>Mn^{+2}>Mg^{+2}>Al^{+3}$. Therefore the resin can recover nickel at pH of 2 and remove other impurities with exception of iron.

As DOWEX™ M4195 has a much higher affinity for copper than nickel and iron, if the process is being used to treat the product liquor from the oxidative leach or bio-leach of a sulfide ore, or leaching of higher copper content laterites, the copper is removed from the product liquor for recovery if economic in step (22) prior to treating the product liquor to the ion exchange step.

The raffinate (7), containing the cobalt can be further treated by known solvent extraction, ion exchange, or precipitation techniques (19) to extract the cobalt and recover it as cobalt sulfide or cobalt hydroxide.

The loaded nickel and iron are eluted from the resin using sulfuric acid solution (8). Previous work carried out on nickel processing has used IX systems to produce a pure nickel eluate, or an eluate containing the nickel and cobalt values. The use of the IX step in this process however, is used to produce a nickel and iron mixture in the eluate suitable for further processing to low iron nickel. This reduces the amount of iron to be neutralised and rejected, reducing the size of the downstream equipment.

The IX eluate undergoes primary neutralisation (9) to pH 2.5-3.5 to precipitate the majority of the iron present in solution as goethite or iron hydroxide, and the clean eluate separated from the precipitate. The neutralising agent is preferably limestone (10), but other suitable neutralising agents such as magnesium carbonate, magnesium oxide, or soda ash or caustic soda may be used instead.

After solid/liquid separation the IX eluate then undergoes secondary neutralisation (12), preferably with magnesium oxide and/or soda ash and/or caustic soda (11), to precipitate a low iron nickel hydroxide, which is filtered to produce a wet cake.

The wet nickel hydroxide cake is dried at 110° C. and fed into horizontal furnace, such as a rotary kiln, or vertical furnace such as a shaft furnace, or other suitable industrial equipment, for calcination (13) at between 1000° C. and 1300° C. under oxidising conditions to produce nickel oxide.

The moisture is driven off by 400° C., and the sulfur content as sulfate, which is removed as sulfur dioxide or sulfur trioxide, is almost completely removed after two hours at 1100° C.

After selection of the appropriate flux, the nickel oxide is then directly smelted (14) together with carbon and an appropriate slag (15) at a temperature of at least 1500° C. preferably around 1600° C. in a suitable industrial furnace, to produce a high quality nickel product. $CaO$—$Al_2O_3$-based slags are good candidates for the slag, although a wide variety of slags can be used. An important requirement is that the mass of the slag and its solubility of MgO are high enough to accommodate the gangue in the calcined nickel oxide.

The remaining carbon in the nickel is removed in a refining step (16) by oxidation, generally by the injection of oxygen (17).

The obtained low iron nickel product contains below 30 ppm sulfur, which is ten times lower than the maximum limit prescribed by ISO 6501 for ferronickel grades FeNi40LC and FeNi40LCLP. The carbon content is below 200 ppm while the maximum level according to the standard is 300 ppm.

The low iron nickel is suitable therefore, for direct addition to stainless steel furnaces and represent a novel nickel product.

A further advantage of the process described is that, as a consequence of the high selectivity of the nickel ion exchange process step for nickel and iron, the impurity levels in the nickel hydroxide product, and consequently in the nickel produced are significantly lower than those currently achieved by the majority of commercial producers, and even those in the "super pure" ferronickel grade.

The new process has a further advantage over the current hydrometallurgical routes, in that it has fewer process steps to convert ore to a finished nickel product, and heap leaching is generally less capital intensive than other leach processes.

Table 1 below gives a comparison of the nickel product purity produced by the process of the invention with that of a commercially available "utility" nickel product. The "utility" nickel product may be used to make nickel sulfate hexahydrate with crystallization, nickel hydroxide or oxide with neutralization, or cathode nickel with electrolysis.

TABLE 1

Purity Comparison (% w/w) with a commercial "Utility" nickel

|  | Ni | Fe | C | Co | Cu | S | Si |
|---|---|---|---|---|---|---|---|
| A commercial "Utility" nickel | >97 | <0.6 | <0.4 | <1.6 | <0.6 | <0.15 | <0.6 |

TABLE 1-continued

Purity Comparison (% w/w) with a commercial "Utility" nickel

|  | Ni | Fe | C | Co | Cu | S | Si |
|---|---|---|---|---|---|---|---|
| Low iron content Nickel of the invention | >98 | <0.4 | <0.2 | <1.0 | <0.1 | <0.05 | <0.1 |

Utility Nickel: Ni/Fe = 160
Ni/(impurities except Fe) = 97/3.35 = 29
Ni/(all impurities) = 97/3.95 = 24

EXAMPLES

Example 1

Nickel Recovery and Purification from a Pregnant Leach Solution (PLS) Obtained from Consecutive Pressure Leach and Atmospheric Leach Limonite and saprolite samples from an Asia Pacific laterite deposit were used for pressure leach and atmospheric leach respectively. The ore was ground to $P_{100}$<300 μm. The solid concentration of limonite and saprolite slurry was 37% w/w and 50% w/w respectively. The autoclave operation conditions targets were set at a capacity of 0.8 tpd limonite, a sulfuric acid to limonite ore ratio of 0.38 and the resident time of 50 minutes at temperature of 270° C. Saprolite was processed at a saprolite to limonite weight ratio of 0.35 and an acid to saprolite weight ratio of 0.6 (including the acid from the autoclave discharge slurry). All saprolite was mixed with the autoclave discharge slurry, and concentrated acid in the first tank of the atmospheric leach circuit. Iron was precipitated as jarosite at >90° C. and atmospheric pressure. The residence time of saprolite leach and iron precipitation was around 10 hours. Prior to the recovery of nickel and cobalt, copper was removed from the PLS. The copper was extracted in fixed bed ion exchange columns with Amberlite IRC 718 resin. The raffinate of the Amberlife IRC 718 columns was then fed to an IX device filled with DOWEX™ M4195 resin for Ni recovery and purification. The acidified, recycled nickel sulfate solution was used as stripping solution to get nickel eluate. The eluate was then neutralized with soda ash solution at 40-50° C. to precipitate residual iron.

As is evident from Table 2, the concentration ratio of Ni/Fe (22500:1) and Ni/(all impurities) (188:1) in the final nickel eluate after iron precipitation was higher than the ratios respectively (160:1 and 24:1) of the commercial "utility" nickel specification shown in Table 1.

TABLE 2

Average Composition of PLS and IX Streams

| Stream | Al mg/L | Co mg/L | Cr mg/L | Cu mg/L | Fe mg/L | Mg mg/L | Mn mg/L | Ni mg/L | Si mg/L | Zn mg/L |
|---|---|---|---|---|---|---|---|---|---|---|
| PLS (CCD Overflow) | 2264 | 485 | 392 | 37 | 1045 | 20791 | 2665 | 7304 | 150 | 135 |
| PLS after Cu removal | 1876 | 487 | 302 | 1 | 479 | 15311 | 2192 | 6280 | 95 | 122 |
| DOWEX™ M 4195 Raffinate | 1572 | 363 | 242 | 0 | 315 | 12911 | 1808 | 800 | 71 | 90 |
| DOWEX™ M 4195 eluate | 7 | 54 | 8 | 2 | 185 | 120 | 9 | 39643 | 26 | 11 |
| Ni eluate after Fe pptn | 7 | 59 | 0 | 1 | 2 | 145 | 0 | 45049 | 26 | 0 |

Final Ni eluate: Ni/Fe = 45059/2 = 22500:1
Ni/(all impurities) = 188:1

Example 2

Nickel Recovery and Purification from the PLS Obtained from a Heap Leach Process A laterite ore was heap leached with sulfuric acid. At ambient temperature, PLS was pumped through copper-IX columns filled with Dow 4196 resin with a functional group of N-(2-hydroxylpropyl) picolylamine to remove copper. The raffinate from the Dow 4196 columns was then fed into the nickel IX equipment filled with DOWEX™ M4195 resin. The stripping solution for the nickel IX was made with the acidified, recycled nickel IX eluate. The raffinate of the nickel IX was recycled to heap as feed solution after acidification. As is evident from Table 3, the concentration ratio of nickel over all impurities in the final nickel eluate (63.2:1) was higher than the equivalent ratio (29) for the commercial "utility" nickel specification shown in Table 1.

TABLE 3

Average Composition of PLS and IX Streams

| Stream | Al mg/L | Co mg/L | Cr mg/L | Cu mg/L | Fe mg/L | Mg mg/L | Mn mg/L | Ni mg/L | Si mg/L | Zn mg/L |
|---|---|---|---|---|---|---|---|---|---|---|
| Heap PLS | 328 | 57 | 47 | 0 | 3546 | 14000 | 370 | 1177 | 59 | 7 |
| Dow 4196 raffinate | 296 | 52 | 42 | 0 | 3269 | 12394 | 320 | 1014 | 53 | 7 |
| Dow 4195 raffinate | 283 | 37 | 40 | 0 | 2384 | 11619 | 303 | 104 | 48 | 5 |
| Ni-elute | 0 | 161 | 9 | 0 | 8681 | 90 | 0 | 12456 | 10 | 17 |

Ni-eluate: Ni/(all impurities) = 63.2:1

Example 3

Iron Precipitation and Nickel Hydroxide Production with Nickel IX Eluate

The high-iron containing nickel IX eluate was mixed with stoichiometric limestone slurry at 60-80° C. to precipitate iron. The iron precipitation commenced at a pH of 1.5 and was completed at a pH of 3.5. After solid/liquid separation the nickel solution was further neutralized with stoichiometric magnesium oxide slurry up to a pH of 8.5 to precipitate nickel hydroxide. Table 4 illustrates the liquid compositions of high-iron containing nickel IX eluate, iron-barren solution obtained at a pH of 3.5 and nickel-barren solution obtained at a pH of 8.5. Table 5 shows the composition of nickel hydroxide product.

TABLE 4

Composition of the feed and barren Solutions after Iron and Nickel Precipitation

| Solution | Al mg/L | Co mg/L | Cr mg/L | Cu mg/L | Fe mg/L | Mg mg/L | Mn mg/L | Ni mg/L | Si mg/L | Zn mg/L |
|---|---|---|---|---|---|---|---|---|---|---|
| High-Fe Ni eluate | 31 | 220 | 11 | 0 | 8000 | 1500 | 37 | 15000 | 19 | 17 |
| Fe-barren solution at pH 3.5 | 0 | 170 | 1 | 0 | 0 | 1800 | 67 | 13000 | 8 | 5 |
| Ni-barren solution at pH 8.5 | 0 | 0 | 2 | 0 | 6 | 6300 | 0 | 42 | 0 | 0 |

TABLE 5

Composition (%) of Nickel Hydroxide

| | Al | Co | Cr | Cu | Fe | Mg | Mn | Ni | Si | Zn |
|---|---|---|---|---|---|---|---|---|---|---|
| Ni(OH)$_2$ product | 0.06 | 0.42 | 0.00 | 0.06 | 0.14 | 4.4 | 0.14 | 31.10 | 0.10 | 0.05 |

Example 4

Calcination of NHP (Nickel Hydroxide Precipitate)

A sample of NHP produced by the process of the invention which contained approximately 33 wt. % moisture was dried at 110° C. The chemistry of the dry NHP is represented in Table 6 below:

TABLE 6

Chemical composition of the NHP dried at 110° C.

| | Element | | | | | | | | | | | |
|---|---|---|---|---|---|---|---|---|---|---|---|---|
| | Al | Ca | Co | Cu | Fe | Ni | Mg | Mn | Na | S | Si | Zn |
| Concentration, wt. % | 0.02 | 0.01 | 0.37 | 0.08 | 0.37 | 46.8 | 5.0 | 0.13 | 0.20 | 3.6 | 0.06 | 0.02 |

The dry NHP was then calcined at 1100° C. under oxidising conditions to remove the crystalline water content and the sulfur content and convert it to nickel oxide. The chemical composition of the material after calcination is represented in Table 7. Almost all of the sulfur was removed in the gas phase.

TABLE 7

Chemical composition of the Nickel Oxide after calcination at 1100° C.

| | Element | | | | | | | | | | | |
|---|---|---|---|---|---|---|---|---|---|---|---|---|
| | Al | Ca | Co | Cu | Fe | Ni | Mg | Mn | Na | S | $SiO_2$ | C |
| Concentration, wt. % | <0.05 | 0.06 | 0.57 | nd | 0.55 | 66.8 | 7.36 | <0.01 | 0.09 | 0.019 | 0.58 | 0.05 |

Example 5

Direct Smelting of the Calcination Product

The nickel oxide from Example 4 was mixed with 8.5 wt. % carbon and together with a flux was added into an alumina crucible. The flux selected in this case was 40% CaO-40% $Al_2O_3$-20% $CaF_2$ and the selected temperature of operation was 1540° C. The sample was maintained at temperature for 1 hour and then cooled. The carbon content of the smelted nickel was 0.223 wt. % and the sulfur content was 0.0013 wt. %.

The carbon content may vary significantly depending on its excess all the way to saturation, which at the temperature of the experiment is approximately 2.6 wt. %.

Example 6

Refining of the Smelt Product Nickel

In the refining step, carbon is removed by oxidation. This can practically be carried out by oxygen injection. In the present experiment the deoxidation of the metallic nickel was carried out by a slag containing NiO. The slag used was 32.8% CaO-32.8% $Al_2O_3$-16.4% $CaF_2$-18% NiO.

The final chemistry of the refined nickel product is represented in Table 8

TABLE 8

Chemical composition of the refined utility nickel.

| | Element | | | | | | | | | | | | |
|---|---|---|---|---|---|---|---|---|---|---|---|---|---|
| | Al | CaO | Co | Cu | Fe | Ni | Mg | Mn | Na | S | Si | C | P |
| Concentration, wt. % | <0.05 | 0.09 | 0.67 | <0.05 | 0.34 | 98.2 | 0.21 | <0.01 | 0.09 | 0.0023 | 0.07 | 0.016 | <0.05 |

| | Element | | | | |
|---|---|---|---|---|---|
| | As | Cd | Na | Sb | O, % |
| Concentration, ppm | <1 | 0.05 | 26 | <0.03 | 0.192 |

Finally it is to be understood that various other modifications and/or alterations may be made without departing from the spirit of the present invention as outlined herein.

The claims defining the invention are as follows:

1. A process for producing a metallic nickel product with a low iron content, including the steps of:
   (i) providing an acidic product liquor containing at least nickel and iron;
   (ii) subjecting said acidic product liquor to an ion exchange process wherein an ion exchange resin selectively absorbs said nickel and part of the iron from said product liquor;
   (iii) eluting the nickel and iron from said resin with an acidic solution to produce an eluate containing said nickel and iron.
   (iv) neutralising said eluate to a pH value in the range from 2.5 to 3.5 to cause precipitation of a substantial amount of said iron, leaving an iron depleted eluate;
   (v) neutralising the iron depleted eluate to a pH value in the range from 7 to 8 to cause precipitation of nickel hydroxide containing low iron;
   (vi) calcining said nickel hydroxide to convert it to nickel oxide;
   (vii) subjecting said nickel oxide to direct smelting in the presence of a reductant to produced a molten nickel phase; and
   (viii) refining said molten nickel phase by oxidation to produce a metallic nickel product with low iron content.

2. A process of claim 1, wherein the metallic nickel product has no more than 1% iron.

3. A process of claim 1, wherein the acidic product liquor is derived from nickel containing ore bodies or concentrates by a process selected from pressure acid leaching, atmospheric acid leaching; heap leaching of a laterite ore; oxidative leaching of nickel sulphide ore; oxidative leaching of nickel sulphide concentrate; bioleaching of nickel sulphide ore; and bio-leaching of nickel sulphide concentrates.

4. A process of claim 1 wherein substantially all copper present is removed from the acidic product liquor prior to step (i).

5. A process of claim 4, wherein the copper is removed by an ion exchange step.

6. A process of claim 4, wherein said removed copper is recovered.

7. A process of claim 4, wherein the acidic product liquor is a pregnant leachate derived from heap leaching a laterite ore.

8. A process of claim 1, wherein the ion exchange resin of step (ii) contains a bis-picolylamine functional group.

9. A process of claim 1, wherein the acidic solution in step (iii) is sulfuric acid.

10. A process of claim 1, wherein the neutralisation of said eluate to a pH from 2.5 to 3.5 in step (iv) is effected by addition of limestone.

11. A process of claim 1, wherein the iron is precipitated as goethite or iron hydroxide.

12. A process of claim 1, wherein the neutralisation of said iron depleted eluate to a pH from 7 to 8 is effected by addition of magnesium oxide, soda ash, or caustic soda.

13. A process of claim 1, wherein the nickel hydroxide produced in step (v) is dried at a temperature of about 100-120° C.

14. A process of claim 1, wherein the calcination to nickel oxide in step (vi) takes place at a temperature in the range of 800 to 1300° C.

15. A process of claim 1, wherein the reductant in the direct smelting step (vii) is carbon.

16. A process of claim 15, wherein a suitable slag is present in the direct smelting step.

17. A process of claim 15, wherein the direct smelting in step (vii) takes place at a temperature of about 1540° C. in the presence of a $CaO$—$Al_2O_3$-based slag.

18. A process of claim 16, wherein if the nickel hydroxide contains an appreciable amount of magnesium oxide, the mass of the slag in step (vii) is sufficiently high to solubilize the magnesium oxide to reduce gangue in the calcined nickel oxide.

19. A process of claim 1, wherein excess carbon is removed during the refining step (viii) by injection of oxygen.

* * * * *